United States Patent [19]

McCoy

[11] Patent Number: 4,667,222

[45] Date of Patent: May 19, 1987

[54] TELEVISION EFFECTS SYSTEM FOR MANIPULATING COMPOSITE COLOR TELEVISION SIGNALS

[75] Inventor: Reginald F. H. McCoy, Gainesville, Fla.

[73] Assignee: Digital Services Corporation, Gainesville, Fla.

[21] Appl. No.: 728,174

[22] Filed: Apr. 29, 1985

[51] Int. Cl.[4] .......................... H04N 9/74; H04N 9/78
[52] U.S. Cl. .......................................... 358/22; 358/31
[58] Field of Search .............................. 358/13, 22, 31

[56] References Cited

U.S. PATENT DOCUMENTS 4,352,122  9/1982  Reitmeier et al. ................ 358/13
4,415,918 11/1983  Lewis .............................. 358/21 R
4,432,009  2/1984  Reitmeier et al. ................ 358/22

OTHER PUBLICATIONS

Rossi, Color Decoding a PCM NTSC Television Signal, Journal of the SMPTE, vol. 83, No. 6, Jun. 1974.

Primary Examiner—John W. Shepperd
Attorney, Agent, or Firm—Charles A. Bevelacqua

[57] ABSTRACT

This invention discloses a system for manipulating color television images transmitted in the NTSC system of television. Manipulation is by known methods which involve storing in a memory picture data as transmitted in the television signal and restructuring the memory addresses to achieve the desired special effects. Unlike other systems, however, the data is stored in its composite form consisting of a luminance component and color information related to the phase and frequency of a subcarrier. The samples are taken at specified intervals and associated in groups. The samples in a group are mathematically combined in such a manner that the color component values are not affected by address manipulation. After manipulation the signal data is restored to its luminance and color components by a method which does not involve the phase or frequency of the subcarrier. These components are then recombined into a standard NTSC signal which will produce a manipulated display in color on the television screen.

9 Claims, 2 Drawing Figures

TELEVISION EFFECTS SYSTEM FOR MANIPULATING COMPOSITE COLOR TELEVISION SIGNALS

BACKGROUND OF THE INVENTION

This invention relates to effects systems for color television picture manipulation, that is, change of size, shape, position or angular rotation and for a method of performing the manipulation.

PRIOR SYSTEMS

A monochrome television picture is comprised of a series of dots having a luminance or brightness determined by the television signal.

To manipulate the picture, the video signal representing the picture is stored in a memory and the information in the memory is reoriented to produce the desired effect. The reoriented information is then displayed on the television screen.

A composite color television signal is comprised of a luminance signal representing picture brightness, superimposed on which is a color subcarrier the phase of which represents the hue of the color and the amplitude of which is related to the saturation of the color.

In the patent application of James W. Norman, III, Ser. No. 436,066 now U.S. Pat. No. 4,533,952 entitled "Digital Video Special Effects System," assigned to the assignee of this application, there is disclosed a digital special effects system which uses an address restructuring technique to produce special effects. However, this system as well as other existing picture manipulation systems cannot manipulate the color television signal in its composite form since the operations on the signal to reposition the display would change the phase of the subcarrier and changing the picture size would change the frequency of the subcarrier, either effect resulting in incorrect colors in the manipulated output. Accordingly, these systems have had to separate the color signal into a luminance component and two color components, which were then manipulated together, and subsequently recombined to form the composite signal.

The need to separate luminance and color components for manipulation requires that the system have additional memory compared with that needed to store a composite signal.

SUMMARY OF THE INVENTION

In this invention, the signal is stored in memory as a composite signal, thus avoiding the need for additional memory for color components.

The signals may be manipulated using an address restructuring technique as in the above-described application of Norman. The signals read from the memory after manipulation are then separated into luminance and two color components by a method which does not involve the phase or frequency of the subcarrier in the manipulated signals. The signals are subjected to processing known as interpolation, which is a known procedure in existing effects systems, then recombined to form a standard composite signal with standard color subcarrier.

Therefore it is an object of this invention to provide a television effects system which stores the original television signal in memory as a composite signal thereby reducing the required memory capacity.

It is another object of this invention to provide a special effects system for color television in which data samples are taken at a time and frequency to ensure that samples are taken whose color components will not be affected by manipulation of the signal.

It is another object of this invention to provide a special effects system for color television which will permit the storage of samples taken from the television picture which is to be manipulated, in their composite form consisting of luminance and color components.

Still another object of this invention is to provide a special effects system which will ensure that a set of samples determined in accordance with their original relationship to the target sample will be read from memory to form the output picture irrespective of the subsequent rearrangement of those samples by picture manipulation to produce the desired effect.

It is also an object of this invention to provide a digital special effects system which will ensure that no matter from what area of the stored picture data is read out in the course of the manipulation effects, there will always be accessed from memory, a group of related data samples.

Another object of this invention is to provide a digital special effects system for color television which will select a group of related data samples for each data sample location in each of which data samples the hue and color saturation components of the composite data signal will have a value which will permit manipulation of the original data sample to produce the desired effect without modifying the hue and color saturation components.

These and other objects, features and advantages of this invention will become apparent from the following description in conjunction with the accompanying drawings.

DETAILED DESCRIPTION OF THE INVENTION

Figure 1:
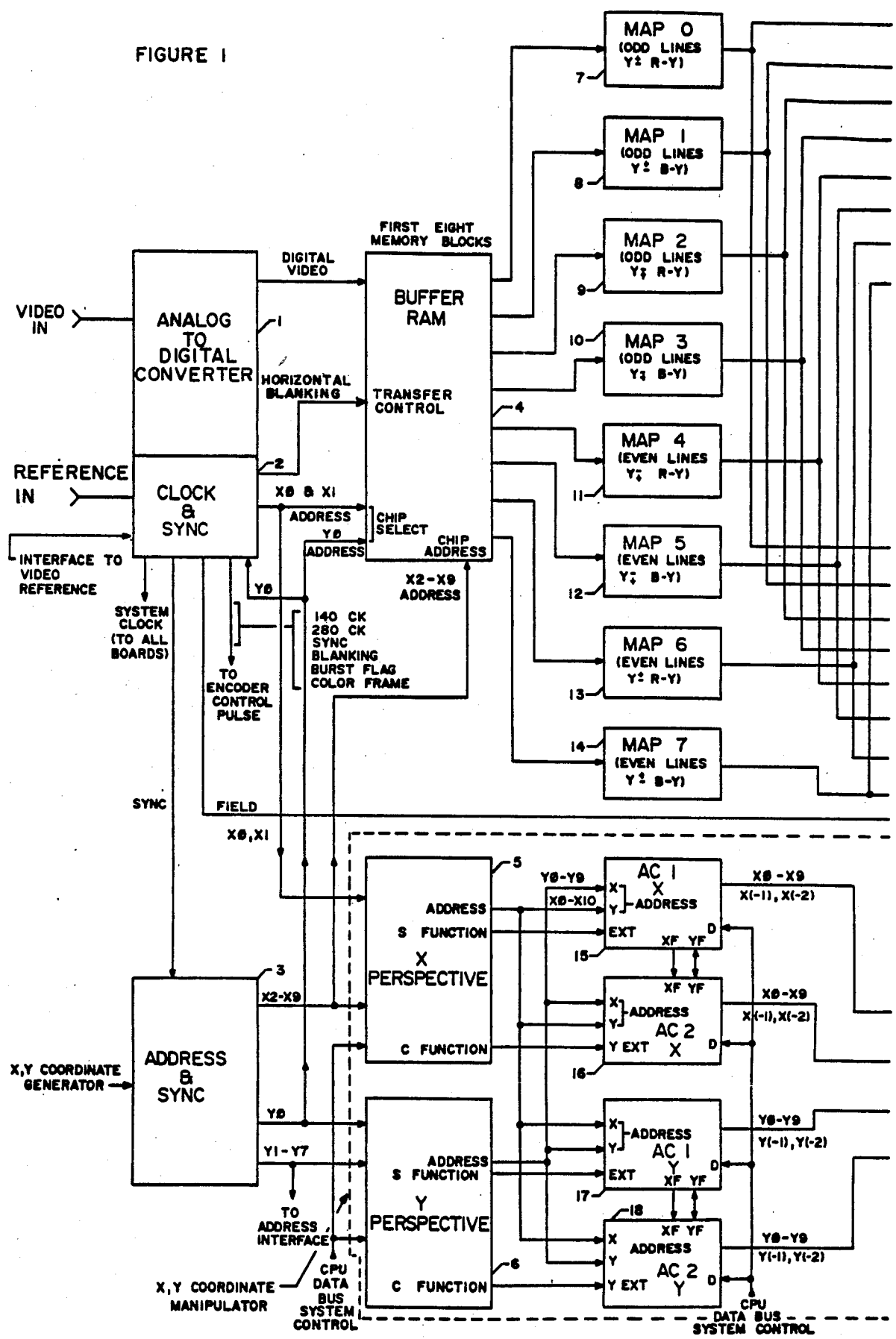
FIGS. 1 and 2 when taken together constitute a schematic block diagram of the system of this invention.

The invention as presently conceived is intended for use with composite television signals of the type known as NTSC, as used in the USA, Canada, and many other countries. In this system the signal may be expressed by the formula:

$$Y + a(B-Y) \sin wt + b(R-Y) \cos wt.$$

where Y is the luminance component, $(B-Y)$ is one of the color components, $(R-Y)$ is the other color component, a and b are constants, "sin" and "cos" designate the sine and cosine respectively of the angle indicated, W is the angular frequency of the subcarrier, and t represents time.

If a sample is taken of such a signal at times when $\sin wt = 0$, then $\cos wt$ will equal $+1$ or $-1$ and the sample will be equal to $Y +/- b(R-Y)$.

Similarly, a sample taken when $\cos wt = 0$ (corresponding to $\sin wt = +/-1$) will be equal to $Y +/- a(B-Y)$.

These results can be obtained by taking samples sequentially when $wt = 0°, 90°, 180°$ and $270°$. This results in a sequence of samples from given lines of the television screen having the values indicated by expressions (1) through (4) as follows:

$$Y + b(R-Y) \tag{1}$$

$$Y + a(B-Y) \quad (2)$$

$$Y - b(R-Y) \quad (3)$$

$$Y - a(B-Y) \quad (4)$$

This requires that four samples be taken within each cycle of the subcarrier, that is the sampling frequency is four times the subcarrier frequency. Prior systems which separately sample luminance and color components and then store in memory normally also employ a sampling frequency at or near this value. Therefore no radical change in sampling frequency is required.

In the system of this invention the samples are stored in memory in the form they are taken from the television signal without separating them into luminance and color components. The memory storage capacity is thus no more than is required to store the luminance component alone in prior systems.

It is a feature of the NTSC system that the subcarrier frequency is so chosen that its phase will differ by 180° from one line to the next. Consequently, if the samples continue to be taken in the same phase, on alternate lines from those for which the expressions (1) through (4) are indicated above, the samples will have the values indicated by expressions (5) through (8) as follows:

$$Y - b(R-Y) \quad (5)$$

$$Y - a(B-Y) \quad (6)$$

$$Y + b(R-Y) \quad (7)$$

$$Y + a(B-Y) \quad (8)$$

The essential feature of this invention is that, irrespective of picture manipulation, each time data is read from the memory to form the output picture, eight addresses in memory corresponding to eight samples, four from each of two adjacent lines, in the sequence in which they were originally sampled, are read out in parallel, that is, simultaneously.

No matter from what area in the stored picture the data is read out in the course of the manipulation effects, there will always be eight parallel signals corresponding to eight samples in the initially written sequence, taken four from each of two adjacent lines, and therefore having the values given by expressions (1) through (8) above.

By examining expressions (1) through (8) it is readily seen that subtracting expression (3) from expression (1) gives $2b(R-Y)$. Similarly (2) minus (4) gives $2a(B-Y)$. Expressions (7) and (5), (8) and (6) may also be combined in this manner.

These results would apply if the values of Y, $(R-Y)$ and $(B-Y)$ did not change from one point to the next. In practice $(R-Y)$ and $(B-Y)$ only change slowly and may be considered equal for the eight samples involved. The luminance value Y does, however, change from one sample to the next. The differences in the Y values will therefore appear when the related pairs of signals given above are subtracted one from the other. We then obtain the following results:

$$(1)-(3)=2b(R-Y)+Y1-Y3$$

$$(2)-(4)=2a(B-Y)+Y2-Y4$$

$$(7)-(5)=2b(R-Y)+Y7-Y5$$

$$(8)-(6)=2a(B-Y)+Y8-Y6$$

where the numerical suffixes to the Y values identify each of the eight samples from which they are taken.

However it is found in practice that although the luminance values of samples may differ from one line to the next, the value of this difference is approximately the same between pairs of corresponding samples on adjacent lines. This can be expressed as:

$$Y5-Y1=Y6-Y2=Y7-Y3=Y8-Y4$$

If we then take the previously derived difference values and add the two which contain $(R-Y)$ we obtain the following result:

$$(1)-(3)+(7)-(5)=4b(R-Y)+(Y7-Y3)-(Y5-Y1)$$

However, $Y5-Y1=Y7-Y3$ so that these two terms cancel, leaving $4b(R-Y)$ free from contamination by the differences of the Y value.

Similarly if the expressions containing $(B-Y)$ are added we obtain the following result:

$$(2)-(4)+(8)-(6)=4a(B-Y)+(Y8-Y4)-(Y6-Y2)$$

Again $Y8-Y4=Y6-Y2$ and these terms cancel, leaving $4a(B-Y)$.

After division by 4 in each of the above cases we have $b(R-Y)$ and $a(B-Y)$. These are the two color components, which may be multiplied by $\cos wt$ and by $\sin wt$ respectively to form the subcarrier component of the NTSC signal required for the output.

Also, by subtracting $b(R-Y)$ or $a(B-Y)$ as appropriate, from each of the eight samples independently we obtain the values of Y1, Y2, Y3, Y4, Y5, Y6, Y7, Y8. These, taken in appropriate sequence, form the Y component of the composite output signal. The known processes of interpolation, providing intermediate values where the manipulation process requires them, may be applied to these Y values before combination with the color subcarrier component derived from $b(R-Y)$ and $a(B-Y)$ to form the composite NTSC signal.

In order that the eight parallel outputs referred to above may be obtained simultaneously it is convenient to divide the total memory into eight blocks into which the data samples of the input video signal are written sequentially, in a sequence of four memory blocks on one line and the other four on the next line, repeating in alternate line sequence. This arranges the samples so that each memory block holds the values given by one of the expressions (1) through (8) above. All eight memory blocks area always read in parallel, the reading addresses of all blocks being subjected to the same processing for picture manipulation. Other methods of obtaining eight parallel outputs from a memory such as serial reading followed by buffering to provide parallel outputs are of course possible but practically less convenient at the high reading speeds required for data representing video signals.

It is not necessary that the eight memory blocks into which the input data is written be the same as those from which the final output is derived. It is possible to write into eight memory blocks in sequence as described above and subsequently to transfer the data in these first eight memory blocks in parallel into a second group of eight memory blocks. Finally these second eight memory blocks are read in parallel to provide the eight signals which are employed, by the subtraction and addition process described above, to provide the b(R−Y), a(B−Y) and Y signals from which the output NTSC composite signal is formed.

The use of a system comprising a first group of eight memory blocks followed by a second group of eight memory blocks, as described in the preceding paragraph has the advantage that the need to write and read memories simultaneously can be avoided.

A television signal consists of lines each occupying a total period, in the NTSC system, of 63.55 microseconds, of which 52.65 microseconds contains signal data representing actual picture content, and 10.9 microseconds, referred to as horizontal blanking, contains no picture content. This latter period contains synchronizing information which it is not required to store in the memory and subject to manipulation as applied to the picture; in fact modification of the synchronizing information must be avoided. It is therefore removed from the signal prior to its being written into the memory, and reinserted in the output signal following reading from memory in manipulated form and all subsequent processing as described above.

Accordingly, it is possible to write the data representing picture content into the first group of eight memory blocks during the 52.65 microseconds active picture time, writing each sample serially, and to transfer the data in all eight of the first group of memory blocks into the second group of memory blocks in parallel, which requires one-eighth of this time or 6.58 microseconds, since all eight are transferred in parallel. Therefore this transfer can be done in the 10.9 microsecond horizontal blanking interval. That is, the first group is read and the second group written, during the horizontal blanking and the first group written and the second group read during the 52.65 microsecond active picture period.

Figure 2:
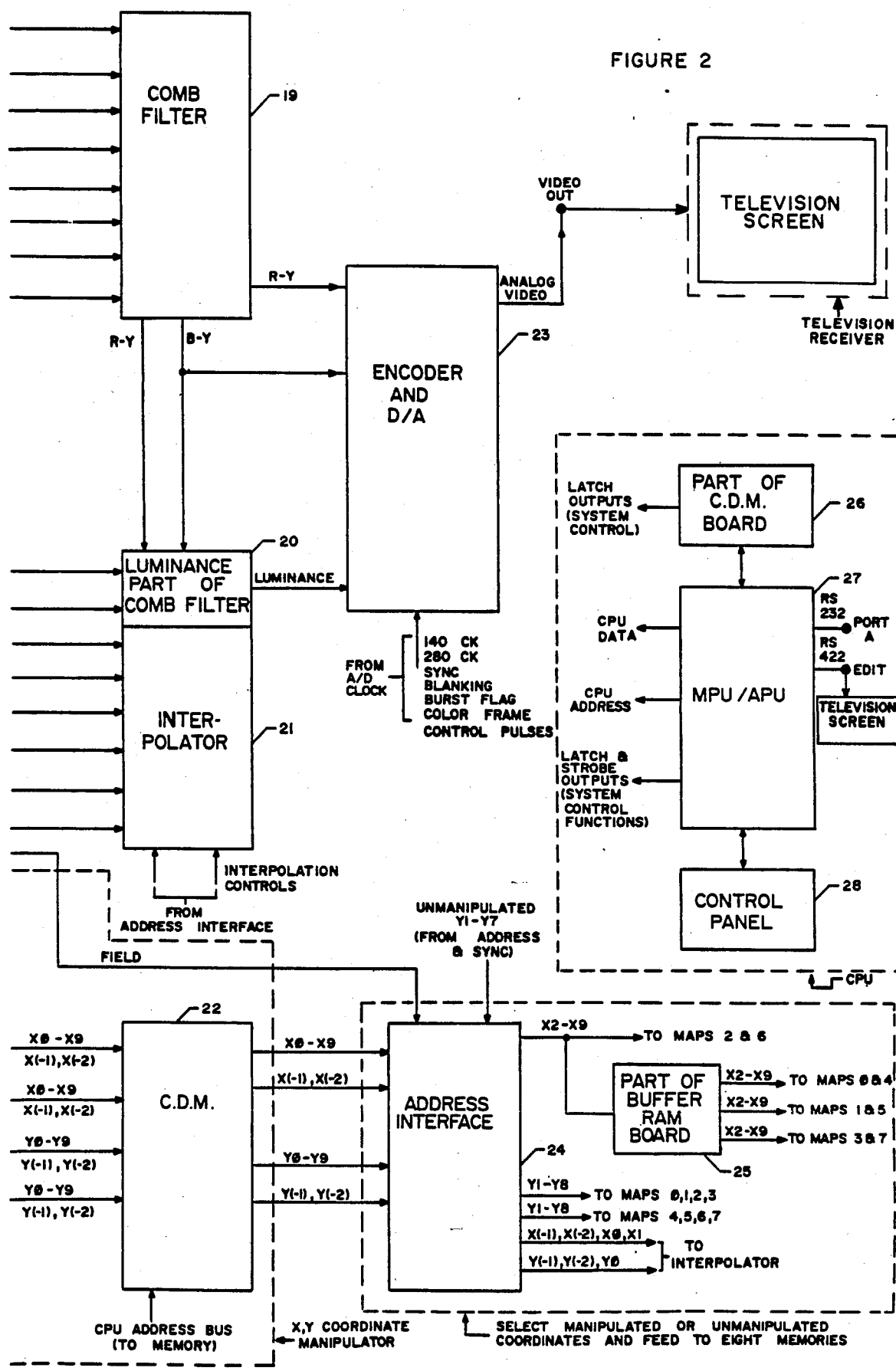

FIGS. 1 and 2 taken together is a schematic block diagram of apparatus which may be used to carry out the invention.

As shown in FIGS. 1 and 2 an analog to digital converter 1 samples the video signal as it comes in analog form and creates for each sample a corresponding 8 bit binary number. The clock and sync 2 creates a system master clock, and multiples of the master clock, to be used throughout the system. It strips sync from the reference to be used by Address and Sync 3 and creates X0 and X1 addresses in phase with the subcarrier. The clock and sync creates the Encoder Control Pulse.

The address and sync create a binary X, Y representation for every real-time video scan pixel. The buffer ram 4 stores the pixel samples for two consecutive video scan lines and writes them into Video Memory indicated by the numerals 7 though 14 during two consecutive horizontal blankings.

The standard manipulation calculation for the system is $X$ (address new)$=AX$ (coordinate$+BY$ (coordinate)$+$offset $Y$ (address new)$=CX$ (coordinate)$+DY$ (coordinate)$+$offset.

X Perspective 5 generates the A coefficient, and Y Perspective 6 generates the D coefficient, such that the final screen image has the look of true perspective. As a result the image seeks out a vanishing point.

These A and D coefficients are fed to the Address Control 1's, 15 and 17, and the Address Control 2's, 16 and 18, where the standard manipulation calculation takes place.

The main Video Memory is comprised of maps 0 through 7 designated by the numerals 7 through 14 and is separated as shown into odd and even lines and video components Y+B−Y and Y+R−Y.

The X address controls 15 and 16, a portion of the standard manipulation calculation for X addresses as follows:

$X$ (address new)$=AX$ (coordinate)$+BY$ (coordinate)$+$offset and the Y address controls 17 and 18 perform a portion of the standard manipulation calculation for Y addresses as follows:

$Y$ (new address)$=CX$ (coordinate)$+DY$ (coordinate)$+$offset.

After the video data is read from memory, pixels from one line are combined in the comb filter 19 with pixels of the next line to derive the color information. The color information is then sent to the Encoder and digital to analog converter 23 where the output signal is built. The luminance part of the comb filter 20 passes the luminance part of the signal to the encoder and digital to analog converter.

The standard manipulation calculation for X and Y is solved by an AC1, 15, 17 or an AC2, 16, 18 in every two clock cycles. An AC1 calculation is 180° out of phase with an AC2 calculation. Thus an AC1 and AC2 pair provide a manipulated coordinate every one clock cycle. The Coordinate Demultiplexer 22 combines the AC1 solution every 2 clock cycles to form a manipulated coordinate stream that has a new coordinate every clock cycle.

The Coordinate Demultiplexer 22 also selects whether calculated coordinates from the AC1's and AC2's or CPU access addresses get passed on to the address interface 24.

The encoder and digital to analog converter 23 assembles the luminance from the data coming from the Comb Filter 19 and Luminance Part of Comb Filter 20. Then the information fromm the Comb Filter 19, the luminance, signals from the A/D 1 and Clock and Sync 2 are combined. The resultant composite video data goes to the digital analog converter, where sync is put in, the analog signal is processed and sent to the video out.

When a target pixel is being accessed in accordance with a manipulated coordinate from the Coordinate Demultiplexer 22, the Interpolator 21 needs information from the target pixel and from the pixel preceding the target pixel and from the two succeeding pixels on the same line. It also needs the four pixels on the next line corresponding to these four. The Address Interface 24 and Part of the Buffer ram 25 provide the addresses for these eight pixels.

The Address Interface 24 also provides low order address information to the Interpolator 21 so it can interpret correctly the eight pixel information it receives.

The block designated 26 is part of the Coordinate Demultiplexer 22. It provides CPU addressable latch lines to the rest of the unit for system control.

The MPU/APU 27 is where the central processor unit and CPU memory reside. The CPU controls the rest of the system by means of latched lines and strobes. The CPU can communicate with the outside world via RS232 port A and RS422 edit. The CPU also communicates with Control Panel 28.

The high speed Arithmetic Processing Unit (APU) is in this block too.

The Control Panel 28 takes operator control instructions via switches and a joystick, converts the instructions into digital information and sends the information to the MPU/APU 27 to be acted upon. It likewise receives status information from the MPU/APU 27 and displays it for the operator.

It will be obvious to those skilled in the art that many variations may be made in the preferred embodiment here presented, without departing from the scope of the present invention as described herein and as claimed in the appended claims.

What is claimed is:

1. A method for producing special effects in color television in the NTSC System which method includes the steps of obtaining samples from the composite video signal at a rate 4 times the frequency of the subcarrier which carries the color information at the 0, 90°, 180°, and 270°, points of the subcarrier frequency wave, in alternate lines of a television field maintaining the samples so taken at the above locations in a group and combining that group with a corresponding group taken at the same rate in each next alternate line of the field but the corresponding samples in each group in each line being taken at a point of the subcarrier frequency differing by 180°, storing the signal samples in memory in their composite form in the combined groups as indicated, addressing the samples so that a given address will automatically call up a combined group of the samples so taken, mathematically combining the samples to separate the color component portion thereof from the luminance component portion thereof and manipulating the addresses of the samples to obtain the desired special effects on the screen.

2. The method set forth in claim 1 further comprising the step of further operating on the manipulated signals to restore them to their composite form with separate luminance and color components.

3. A method for producing special effects in color television signals in the NTSC system, which method includes the steps of storing composite signal data composed of luminance combined with a subcarrier modulated with two color components in related groups of eight signal samples composed of two sets of four samples, taken from each of two succeeding lines in a television field, each of said sets of four samples being formed of samples taken at intervals corresponding to a phase difference of 90° at the frequency of said subcarrier, assigning memory addresses to such data in a manner which will ensure the call up of the entire group of eight samples as eight separate precalled data signals by any given memory address, manipulating said memory addresses to obtain the desired special effects, combining said eight separate parallel signals in a manner to separate the luminance and the two color components, modulating each of the two color components onto a subcarrier and combining the resulting subcarrier signals with the luminance in the manner specified by the NTSC system standards to form a composite color television signal, whereby a composite NTSC color television signal may be manipulated and in consequence of the separation and recombination of the luminance and color components, the manipulated signal will also conform to NTSC system standards.

4. The method described in claim 3 wherein samples taken from one line of a field of the television screen at points on the frequency wave of the color subcarrier of 0°, 90°, 180° and 270°, constitute the first set of samples and samples taken at the 180°, 270°, 0° and 90° points of the frequency wave of the color subcarrier for the next line of the same field constitute the second set of samples included in the group of eight samples.

5. A color television special effects system for manipulating an input signal formed in accordance with the NTSC system, said special effects system comprising means for obtaining samples in sequential fashion from successive lines of a field of the television picture, means for controlling the sampling function to ensure the taking of samples on a given line in the field, and on alternative lines thereafter, at intervals corresponding to phases of the color subcarrier of the NTSC system of 0°, 90°, 180° and 270°, means for storing said first set of samples in a first memory, means for taking second sets of samples on the next line of the field, and on alternate lines thereafter, at intervals corresponding to phases of said color subcarrier of 180°, 270°, 0° and 90°, means for storing said second sets of samples in a second memory; means for calling up from said first and second memories with a single address, groups of eight samples, comprising a first set of samples and an adjacent second set of samples, means for manipulating the addresses of the samples to produce the desired special effects, means for deriving difference values between pairs of non-adjacent samples in said first sets of samples and in corresponding pairs of samples in said second sets of samples, means utilizing said difference values and by venture of the selection of samples at the specified phases being able to derive separate values corresponding to luminance and color components of each sample, means for producing an output signal comprised of samples arranged in accordance with the desired special effects and means for inserting luminance and color component values into each sample as it occurs in the output signal to form a composite color television signal in accordance with NTSC system standards.

6. The color television special effects system as set forth in claim 5, in which said means for controlling the sampling function is in part controlled by sync whereby the initial samples taken from each television line will be vertically aligned.

7. The color television special effects system as set forth in claim 5 having said first memory and said second memory each independently comprised of an input memory and an output memory, said input memory being comprised of several sections wherein storage of said samples may be performed at times related to the timing of said input signal, said output memory being comprised of a like number of sections from which said first set of samples and said second set of samples may be called up by said single address in parallel, and means for transferring samples stored in said several sections of said input memory into corresponding sections of said output memory at times differing from the times of storage of samples into said input memory and the times of calling up samples from said output memory, whereby output signals may be obtained from the system at the same times as input signals are being stored therein.

8. The color television special effects system as set forth in claim 7 having means for timing the storage of samples in said input memory, and the timing of calling up of samples from said output memory both to be concurrent with active picture time; and means for timing the transfer of samples from said input memory to said output memory to be concurrent with horizontal blanking intervals.

9. A color television special effects system comprising means for obtaining samples of an input signal in sequential fashion from successive lines of a field of a television picture; an input memory comprised of several sections; means for storing said samples in said input memory during active picture time; an output memory having a like number of sections to said input memory; means for calling up output samples from said output memory; means for selecting the output samples to be called up from said output memory by way of an output address; means for manipulating output addresses to produce the desired special effects; means for transferring samples stored in said several sections of said input memory, in parallel, into corresponding sections of said output memory during horizontal blanking intervals; means for separating output samples into their component values including luminance and color component values and means for forming said output samples into a standard composite television signal.

* * * * *